(12) United States Patent
Ergen et al.

(10) Patent No.: US 8,451,794 B2
(45) Date of Patent: May 28, 2013

(54) HETEROGENEOUS ACCESS SERVICE NETWORK (ASN)-GATEWAY IN AN ASN IN A WORLDWIDE INTEROPERABILITY FOR MICROWAVE ACCESS (WIMAX) COMMUNICATION NETWORK

(75) Inventors: Mustafa Ergen, Oakland, CA (US); Rehan Jalil, San Jose, CA (US); Tony Mak, San Francisco, CA (US)

(73) Assignee: WiChorus Inc., Santa Clara, CA (US)

( * ) Notice: Subject to any disclaimer, the term of this patent is extended or adjusted under 35 U.S.C. 154(b) by 1083 days.

(21) Appl. No.: 11/856,067

(22) Filed: Sep. 17, 2007

(65) Prior Publication Data

US 2008/0081625 A1    Apr. 3, 2008

Related U.S. Application Data

(60) Provisional application No. 60/848,103, filed on Sep. 29, 2006.

(51) Int. Cl.
*H04W 4/00*    (2009.01)

(52) U.S. Cl.
USPC .......................................... 370/331; 455/436

(58) Field of Classification Search
USPC ................. 370/310, 328, 329, 331; 455/403, 455/422.1, 436, 450, 73, 550.1, 560, 561
See application file for complete search history.

(56) References Cited

U.S. PATENT DOCUMENTS

| | | | |
|---|---|---|---|
| 7,924,786 B2* | 4/2011 | Oh et al. | 370/331 |
| 2006/0030322 A1* | 2/2006 | Kim et al. | 455/436 |
| 2006/0153235 A1* | 7/2006 | Kiernan et al. | 370/469 |
| 2006/0176853 A1* | 8/2006 | Liu et al. | 370/331 |
| 2007/0259692 A1* | 11/2007 | Venkatachalam | 455/560 |
| 2009/0163207 A1* | 6/2009 | Randall et al. | 455/436 |

* cited by examiner

*Primary Examiner* — Chi Pham
*Assistant Examiner* — Weibin Huang
(74) *Attorney, Agent, or Firm* — Hamilton, Brook, Smith & Reynolds, P.C.

(57) ABSTRACT

A heterogeneous Access Service Network-Gateway (ASN-GW) in an ASN in a WiMAX communication network. The heterogeneous ASN-GW includes a radio resource module and a handover module. The radio resource module provides Radio Resource Management (RRM) to a set of BTSs in the ASN. A BTS operates in one of the second-profile and the first-profile. The handover module is operatively coupled with the radio resource module. The handover module provides handover management to at least one BTS.

26 Claims, 12 Drawing Sheets

HETEROGENEOUS ACCESS SERVICE NETWORK (ASN)-GATEWAY IN AN ASN IN A WORLDWIDE INTEROPERABILITY FOR MICROWAVE ACCESS (WIMAX) COMMUNICATION NETWORK

RELATED APPLICATIONS

Benefit is claimed under 35 U.S.C 119(e) to U.S. Provisional Application Ser. No. 60/848,103, entitled "Profile Independent ASN Gateway", by Mustafa Ergen et al., filed on Sep. 29, 2006, which is herein incorporated in its entirety by references for all purposes.

FIELD OF THE INVENTION

The invention generally relates to a Worldwide Interoperability for Microwave Access (WiMAX) communication network. More specifically, the invention relates to architecture of Access Service Network (ASN) in a WiMAX communication network.

BACKGROUND OF THE INVENTION

In a Worldwide Interoperability for Microwave Access (WiMAX) communication network, an Access Service Network (ASN) forms the radio access network. The ASN includes one or more ASN-Gateways (ASN-GWs) and a plurality of Base Transceiver Stations (BTSs). Each ASN-GW interfaces with one or more BTSs in the ASN. The ASN performs functions such as Radio Resource Management (RRM) and mobility related functions (for example, handover management).

In the WiMAX communication network, the functions of the ASN can be distributed between an ASN-GW and BTSs interfacing with the ASN-GW. RRM and mobility management may be implemented in a centralized load balancing approach, which corresponds to a first-profile. Alternatively, RRM and Mobility management may be implemented in a distributed load balancing approach, which corresponds to a second-profile. The first-profile may be, for example, the profile-A, and the second-profile may be, for example, the profile-C, as defined by the WiMAX NWG Release 1.0.

In the first-profile, a BTS includes a RRA and a HOA, and an ASN-GW, which the BTS interfaces with, includes a RRC and a HOC. The RRC communicates with the RRA of the BTS to provide RRM. Similarly, the HOC communicates with the HOA to provide handover management.

However, in the second-profile, the network elements involved in RRM are RRC, RRA and RRM relay. Further, network elements involved in handover management are HOC, HOA and HOC relay. In the second-profile, a BTS includes a RRA and a RRC that communicates with the RRA for providing RRM. The BTS also includes a HOA and a HOC that communicates with the HOA for providing handover management. The ASN-GW which the BTS interfaces with includes a RRM relay and a HOC relay. The RRM relay mediates communication between a RRC of a second-profile BTS, and a RRC of another second-profile BTS. Similarly, the HOC relay mediates communication between a HOC of a second-profile BTS and a HOC of another second-profile BTS.

However, if the ASN is operating in one of the first-profile and the second-profile, then a network element, i.e., an ASN-GW or a BTS, which is of a profile different than the profile that the ASN is operating in, will not be able to communicate in the ASN.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a heterogeneous Access Service Network-Gateway (ASN-GW) in an ASN in a Worldwide Interoperability for Microwave Access (WiMAX) communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the present invention described herein may be comprised of one or more conventional transaction-clients and unique stored program instructions that control the one or more transaction-clients to implement, in conjunction with certain non-transaction-client circuits, some, most, or all of the functions of a method related to a heterogeneous ASN-GW. The non-transaction-client circuits may include, but are not limited to, a radio receiver, a radio transmitter, signal drivers, clock circuits, power source circuits, and user input devices. As such, these functions may be interpreted as steps of methods related to a heterogeneous ASN-GW. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various embodiments of the invention provide methods and systems related to a heterogeneous ASN-GW in an ASN in a WiMAX communication network. The heterogeneous ASN-GW includes a radio resource module and a handover module. The radio resource module provides Radio Resource Management (RRM) to a set of Base Transceiver Station (BTSs) in the ASN. Each BTS in the set of BTSs operates in one of the first-profile and the second-profile. The first-profile may be, for example, the profile-A, and the second-profile may be, for example, the profile-C, as defined by the WiMAX NWG Release 1.0. The handover module is operatively coupled with the radio resource module. The handover module provides handover management to one or more BTSs in the set of BTSs.

Figure 1:
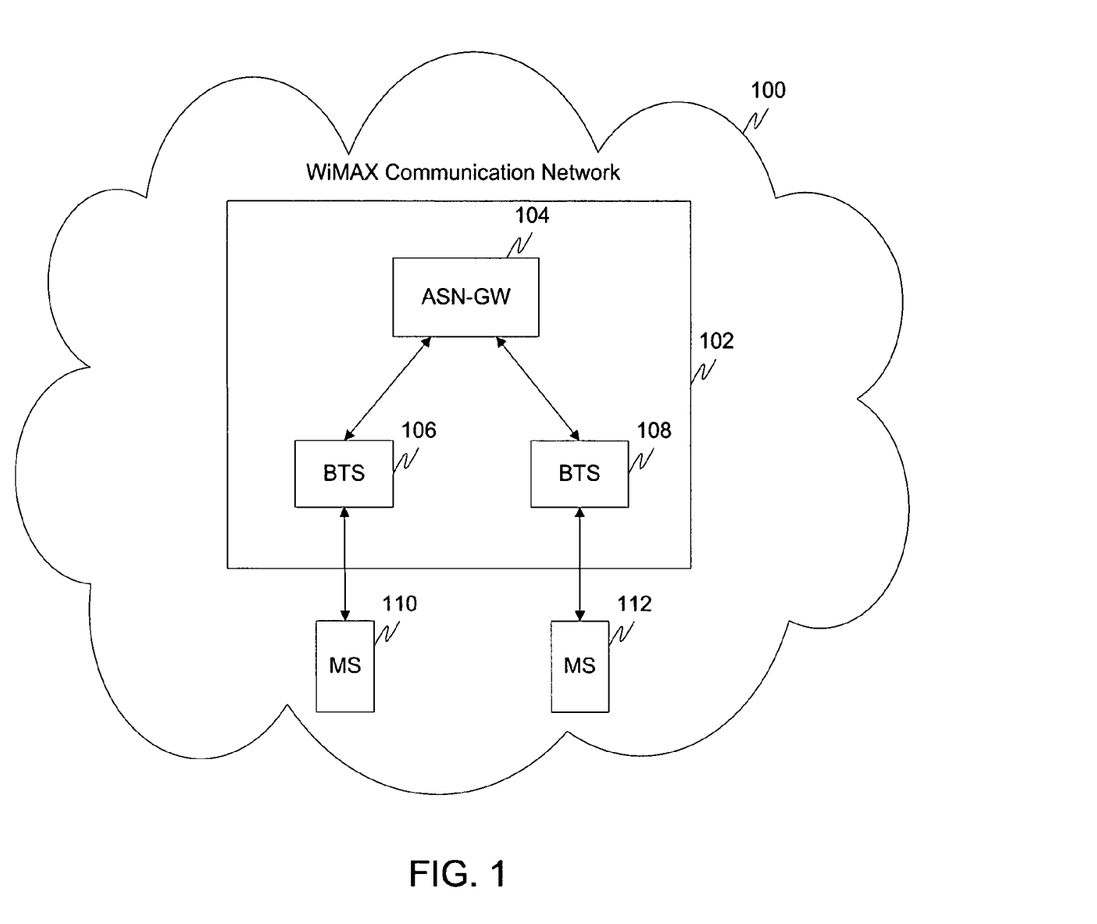
FIG. 1 is a block diagram showing a Worldwide Interoperability for Microwave Access (WiMAX) communication network (that is exemplary) in which various embodiments of the invention may function.

FIG. 1 is block diagram showing a Worldwide Interoperability for Microwave Access (WiMAX) communication network 100 (that is exemplary) in which various embodiments of the invention may function. WiMAX communication network 100 includes an Access Service Network (ASN) 102. It will be apparent to a person skilled in the art that WiMAX communication network 100 may include more than one ASN. ASN 102 includes an ASN-Gateway (GW) 104 that communicates with a Base Transceiver Station (BTS) 106 and a BTS 108 to perform RRM and handover management. It will be apparent to a person skilled in the art that ASN 102 may include more than one ASN-GW and each ASN-GW may communicate with more than two BTSs. Further, BTS 106 communicates with a Mobile Station (MS) 110 and BTS 108 communicates with a MS 112 to provide them various communication services in ASN 102. A MS may be, for example, a laptop computer, or a hand-held device using which a subscriber avails services over WiMAX connectivity. It will be apparent to a person skilled in the art that a BTS may communicate with more than one MS.

Figure 2:
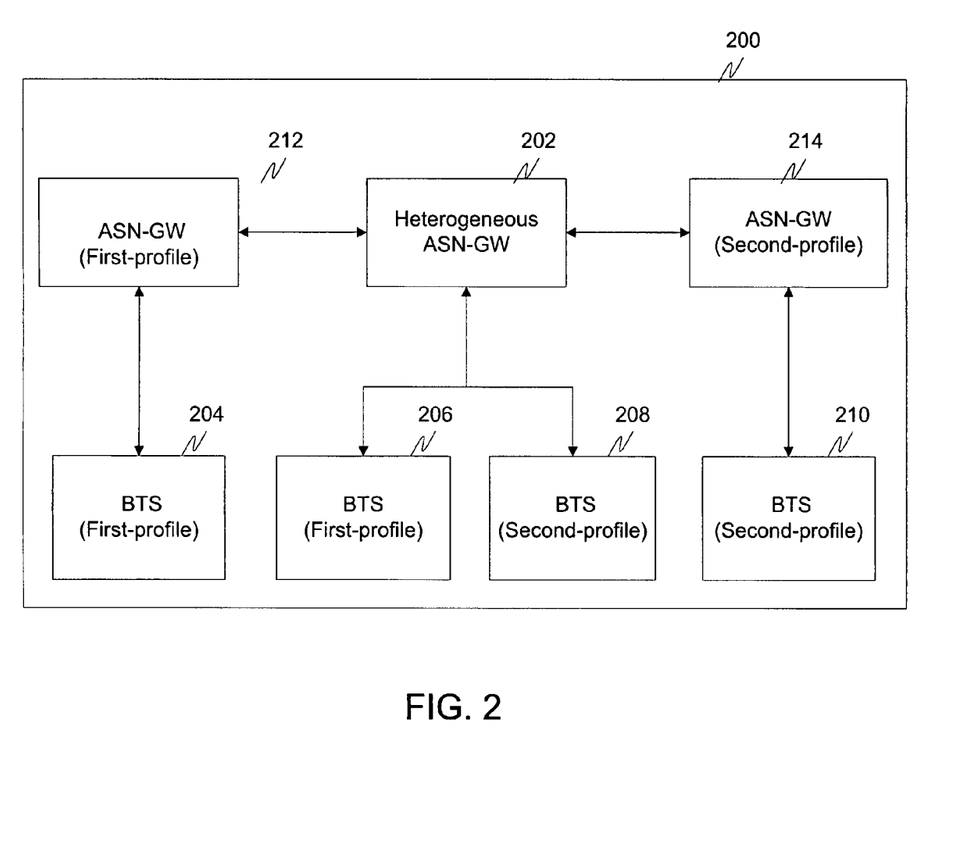
FIG. 2 is a block diagram showing a system for communication in an Access Service Network (ASN) in a WiMAX communication network, in accordance with an embodiment of the invention.

FIG. 2 is a block diagram showing a system 200 for communication in ASN 102 in WiMAX communication network 100, in accordance with an embodiment of the invention. System 200 includes one or more heterogeneous ASN-GWs (for example, a heterogeneous ASN-GW 202) and a plurality of BTSs (for example, a BTS 204, a BTS 206, a BTS 208, and a BTS 210). Heterogeneous ASN-GW 202 operates in each of the first-profile and the second-profile in ASN 102. Further, a BTS in system 200 operates in one of the first-profile and the second-profile in ASN 102. For example, each of BTS 204 and BTS 206 operate in the first-profile and each of BTS 208 and BTS 210 operates in the second-profile. Since heterogeneous ASN-GW 202 operates in each of the first-profile and the second-profile, therefore heterogeneous ASN-GW 202 can interface with each of BTS 206 that operates in the first-profile and BTS 208 that operates in the second-profile.

Additionally, heterogeneous ASN-GW 202 interfaces with one or more ASN-GWs (for example, an ASN-GW 212 and an ASN-GW 214) in system 200. An ASN-GW operates in one of the first-profile and the second-profile in ASN 102. For example, ASN-GW 212 operates in the first-profile and ASN-GW 214 operates in the second-profile. Since heterogeneous ASN-GW 202 operates in each of the first-profile and the second-profile, therefore heterogeneous ASN-GW 202 can interface with each of ASN-GW 212 and ASN-GW 214. Further, an ASN-GW interfaces with one or more BTSs in system 200. For example, ASN-GW 212 interfaces with BTS 204 as each of ASN-GW 212 and BTS 204 operate in the first-profile. Similarly, ASN-GW 214 interfaces with BTS 210 as each of ASN-GW 214 and BTS 210 operate in the second-profile.

Therefore, heterogeneous ASN-GW 202 is a profile independent ASN-GW that can interface with an ASN-GW and a BTS in WiMAX communication network 100 irrespective of the profile they are operating in. While interfacing with a first-profile BTS, heterogeneous ASN-GW 202 operates as a first-profile ASN-GW. Similarly, while interfacing with a second-profile BTS, heterogeneous ASN-GW 202 operates as a second-profile ASN-GW.

Figure 3:
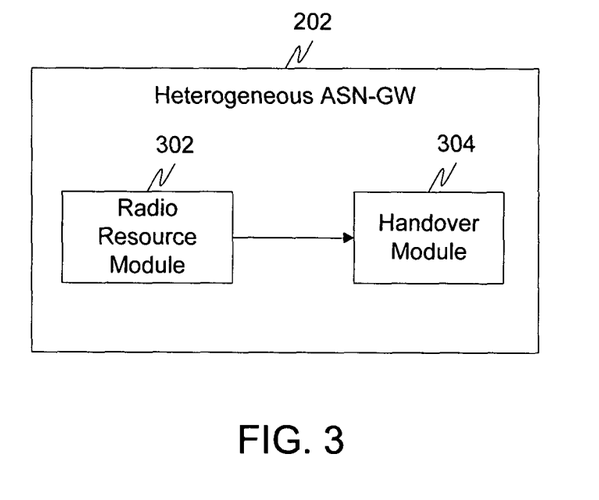
FIG. 3 is a block diagram showing various elements of a heterogeneous ASN-GW, in accordance with an embodiment of the invention.

FIG. 3 is a block diagram showing various elements of heterogeneous ASN-GW 202, in accordance with an embodiment of the invention. Heterogeneous ASN-GW 202 includes a radio resource module 302 and a handover module 304. Radio resource module 302 provides RRM to a set of BTSs in ASN 102. In RRM, radio resource related information is shared between elements in an ASN, for example, between two BTSs in the ASN or between a BTS and an ASN-GW in the ASN. Radio resource related information, may include one or more of a spare capacity in a BTS, wireless link capability of a BTS, and a PHY parameter report of a MS. For example, BTS 206 communicates a spare capacity report to heterogeneous ASN-GW 202, which further communicates the spare capacity report to BTS 208. In another example, BTS 206 may periodically communicate a spare capacity report and a PHY parameter report to heterogeneous ASN-GW 202.

The radio resource related information obtained by radio resource module 302 is used by handover module 304, which is operatively coupled with radio resource module 302, to provide handover management to one or more BTSs in the set of BTSs in ASN 102. Handover management includes transferring connectivity of a MS from a serving BTS to a target BTS. The transfer of connectivity may be initiated by one of a MS, a BTS interfacing with the MS, and an ASN-GW interfacing with the BTS. A MS may initiate a handover of the MS, for example, when a MS moves from a first coverage area to a second coverage area. A BTS and an ASN-GW may initiate a handover of a MS, for example, to balance load on the BTS interfacing with the MS. As an example of a handover in ASN 102, a MS, which is initially in communication with BTS 206, initiates a handover request for handover. BTS 206 communicates the handover request to heterogeneous ASN-GW 202. In response to the handover request and based on the radio resource related information obtained by radio resource module 302, handover module 304 determines that BTS 208 has the spare capacity to serve the MS. Thereafter, the MS is handed over from BTS 206 to BTS 208.

In order to provide RRM and handover management to each of first-profile BTS and second-profile BTS interfacing with heterogeneous ASN-GW 202, each of radio resource module 302 and handover module 304 operate and provide functionalities in accordance with the profile of a BTS interfacing with heterogeneous ASN-GW 202. This has been explained in conjunction with FIG. 4 and FIG. 5.

Figure 4:
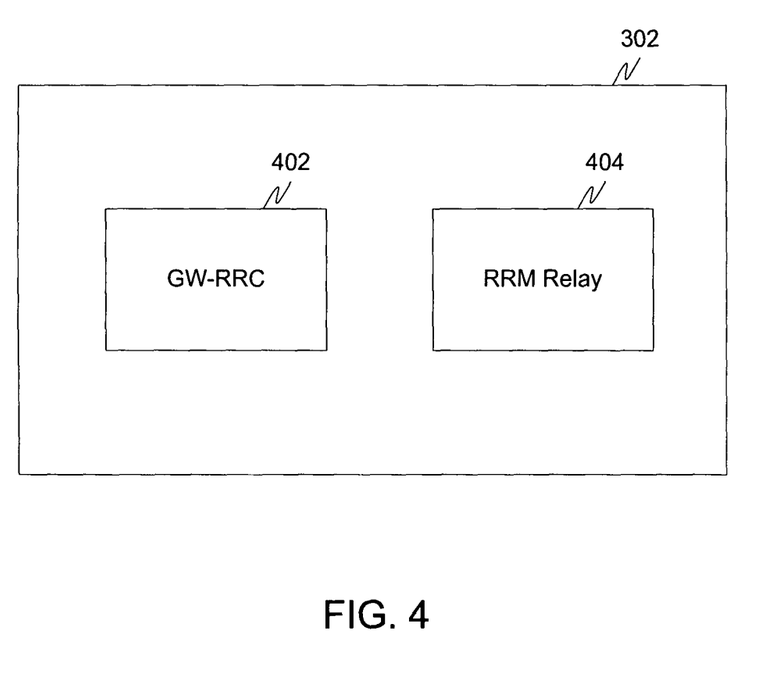
FIG. 4 is a block diagram showing various elements of a radio resource module, in accordance with an embodiment of the invention.

FIG. 4 is a block diagram showing various elements of radio resource module 302, in accordance with an embodiment of the invention. Radio resource module 302 includes a GW-Radio Resource Controller (GW-RRC) 402 and a RRM relay 404 to provide RRM to each of first-profile BTS and second-profile BTS interfacing with heterogeneous ASN-GW 202.

One or more of a first-profile BTS and a second-profile BTS communicate with heterogeneous ASN-GW 202 for RRM. A RRM related communication from one or more of a first-profile BTS and a second-profile BTS is received at RRM relay 404. Thereafter, RRM relay 404 forwards the communication to one of GW-RRC 402 and a BTS-RRC depending on the profiles of the BTSs involved in the RRM related communication. In case BTSs involved in the RRM related communication are each a first-profile BTS, then RRM relay 404 forwards incoming RRM related communication to GW-RRC 402. However, in case BTSs involved in the RRM related communication are each a second-profile BTS, then RRM relay 404 relays the RRM related communication from one second-profile BTS to another second-profile BTS. A second-profile BTS includes each of a BTS-RRC and a Radio Resource Agent (RRA). However, a first-profile BTS includes a RRA. A BTS-RRC of each second-profile BTS, which interfaces with heterogeneous ASN-GW 202, may communicate with each of GW-RRC 402 and RRM relay 404 for RRM. Similarly, a RRA of each first-profile BTS, which interfaces with heterogeneous ASN-GW 202, communicates with GW-RRC 402 through RRM relay 404 for RRM.

When heterogeneous ASN-GW 202 interfaces with a first-profile BTS, heterogeneous ASN-GW 202 acts as a first-profile ASN-GW. Therefore, GW-RRC 402 communicates with a RRA in the first-profile BTS to provide RRM. For example, GW-RRC 402 communicates with a RRA (not shown in the FIG. 4) in BTS 206 to provide RRM to BTS 206. Similarly, when heterogeneous ASN-GW 202 interfaces with a second-profile BTS, heterogeneous ASN-GW 202 acts as a second-profile ASN-GW. When heterogeneous ASN-GW 202 interfaces with second-profile BTSs, RRM relay 404 facilitates communication between a RRC in a second-profile BTS and a RRC in another second-profile BTS. For example, RRM relay 404 facilitates communication between a RRC in BTS 208 and a RRC in BTS 210, which interfaces with ASN-GW 214.

Additionally, while interfacing with a second-profile BTS, heterogeneous ASN-GW 202 facilitates communication between a first-profile BTS and the second-profile BTS. Heterogeneous ASN-GW 202 independently communicates with the first-profile BTS and receives radio resource related information of the first-profile BTS. Subsequently, when the second-profile BTS requests heterogeneous ASN-GW 202 for radio resource related information of the first-profile BTS, heterogeneous ASN-GW 202 provides this information to the second-profile BTS. For example, when BTS 208 needs radio resource related information from BTS 206, a BTS-RRC of BTS 208 communicates with GW-RRC 402, through RRM relay 404, in heterogeneous ASN-GW 202. Subsequently, GW-RRC 402, which already has the radio resource related information of BTS 206, communicates the radio resource related information to a BTS-RRC of BTS 208. Therefore, GW-RRC 402 and RRM relay 404 enable heterogeneous ASN-GW 202 to provide RRM to each first-profile BTS and each second-profile BTS.

To provide RRM to each first-profile BTS and each second-profile BTS in ASN 102, radio resource related information is communicated amongst BTSs and ASN-GWs in ASN 102. The radio resource related information is communicated in the form of RRM procedures that include one or more messages. A message may be one of a RRM PHY parameter request/report, RRM spare capacity request/report, and RRM neighbor BTS radio resource status update. When heterogeneous ASN-GW 202 interfaces with a first-profile BTS, each of a RRM PHY parameter report, RRM spare capacity report, and RRM neighbor BTS resource status update is exchanged between the first-profile BTS and heterogeneous ASN-GW 202. However, when heterogeneous ASN-GW 202 interfaces with a second-profile BTS, only RRM spare capacity report is exchanged between the second-profile BTS and heterogeneous ASN-GW 202.

For communicating radio resource related information, GW-RRC 402 sends one or more of a spare capacity request and a PHY parameter request to each first-profile BTS that interface with heterogeneous ASN-GW 202 and each second-profile BTS that interface with heterogeneous ASN-GW 202. In response to the PHY parameter request, each second-profile BTS discards the PHY parameter request as the PHY parameter report is used by a RRC which in case of a second-profile BTS, is situated within the second-profile BTS. However, in case of first-profile BTSs, in response to the corresponding PHY parameter request sent by GW-RRC 402, the GW-RRC 402 receives a PHY parameter report, through RRM relay 404, from each first-profile BTS that interfaces with heterogeneous ASN-GW 202. This enables heterogeneous ASN-GW 202 to detect the profile of a BTS based on the response of the BTS to the PHY parameter request. Heterogeneous ASN-GW 202 determines a BTS to be a first-profile BTS if GW-RRC 402 receives a PHY parameter report in response to the PHY parameter request from the BTS. Similarly, heterogeneous ASN-GW 202 determines a BTS to be a second-profile BTS if GW-RRC 402 does not receive a PHY parameter report in response to the PHY parameter request from the BTS.

Further, in response to the corresponding spare capacity request received from GW-RRC 402, each first-profile BTS that interfaces with heterogeneous ASN-GW 202 and each second-profile BTS that interfaces with heterogeneous ASN-GW 202 send a spare capacity report to GW-RRC 402, through RRM relay 404. Each first-profile BTS and each second-profile BTS may periodically send a spare capacity report to GW-RRC 402, through RRM relay 404, in response to the corresponding spare capacity request. In this case, GW-RRC 402 embeds instruction in the spare capacity request to receive a spare capacity report periodically.

In an embodiment of the invention, a BTS-RRC of a second-profile BTS that interfaces with heterogeneous ASN-GW 202 communicates with GW-RRC 402, through RRM relay 404, to receive a spare capacity report of a first-profile BTS. GW-RRC 402 sends the spare capacity report of the first-profile BTS, which GW-RRC 402 already has, to the second-profile BTS. For example, GW-RRC 402 has received a spare capacity report of BTS 206. Thereafter, a BTS-RRC in BTS 208 communicates with GW-RRC 402, through RRM relay 404, to receive the spare capacity report of BTS 206. In response to this, heterogeneous ASN-GW 202 sends the spare capacity report of BTS 206 to BTS 208.

Figure 5:
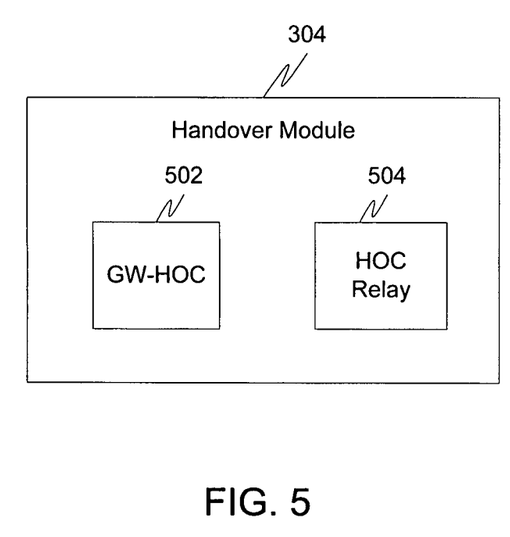
FIG. 5 is a block diagram showing various elements of a handover module, in accordance with an embodiment of the invention.

FIG. 5 is a block diagram showing various elements of handover module 304, in accordance with an embodiment of the invention. Handover module 304 includes a GW-Handover Controller (GW-HOC) 502 and a HOC relay 504 to provide handover management to each first-profile BTS and each second-profile BTS that interface with heterogeneous ASN-GW 202.

GW-HOC 502 communicates with one or more first-profile BTSs that interface with heterogeneous ASN-GW 202 and one or more second-profile BTSs that interface with heterogeneous ASN-GW 202 in ASN 102. However, HOC relay 504 communicates with one or more second-profile BTSs that interface with heterogeneous ASN-GW 202 in ASN 102. A second-profile BTS includes a BTS-Handover Controller (BTS-HOC) and a Handover Agent (HOA). However, a first-profile BTS includes a HOA.

A BTS-HOC of each second-profile BTS, which interfaces with heterogeneous ASN-GW 202, may communicate with a HOC relay 504 and GW-HOC 502 (through HOC relay 504) for handover management. Similarly, a HOA of each first-profile BTS, which interfaces with heterogeneous ASN-GW 202, communicates with GW-HOC 502, through HOC relay 504, for handover management. A handover related communication from one or more of a first-profile BTS and a second-profile BTS is received at HOC relay 504. Thereafter, HOC relay 504 forwards the handover related communication to one of GW-HOC 502 and BTS-HOC depending on the BTSs involved in the handover related communication. In case BTSs involved in the handover related communication are each a first-profile BTS, then HOC relay 504 forwards incoming handover related communication to GW-HOC 502. However, in case BTSs involved in the handover related communication are each a second-profile BTS, then HOC relay 504 relays the handover related communication from one second-profile BTS to another second-profile BTS.

When heterogeneous ASN-GW 202 interfaces with a first-profile BTS, heterogeneous ASN-GW 202 acts as a first-profile ASN-GW. Therefore, GW-HOC 502 may communicate with a HOA in the first-profile BTS to provide handover management to the first-profile BTS. For example, GW-HOC 502 communicates with a HOA (not shown in the FIG. 5) in BTS 206 to provide handover management to BTS 206. In order to handover a MS from a serving first-profile BTS to a target first-profile BTS, a HOA in the serving first-profile BTS communicates a handover request, which is initiated by the MS, to GW-HOC 502, through HOC relay 504. GW-HOC 502 further communicates the handover request to a HOA in the target first-profile BTS. Thereafter, the MS is handed over from the serving first-profile BTS to the target first-profile BTS.

Further, in order to handover a MS from a first-profile BTS to a second-profile BTS, a HOA in the first-profile BTS communicates a handover request, initiated by the MS, to GW-HOC 502, through HOC relay 504, for a handover of the MS. GW-HOC 502 then communicates with GW-RRC 402 to determine a second-profile BTS that has spare capacity to accommodate the MS. Thereafter, GW-HOC 502 communicates the handover request to a BTS-HOC in the second-profile BTS. Subsequently, the MS is handed over from the first-profile BTS to the second-profile BTS. For example, a MS is in communication with BTS 206. The MS initiates a handover request to BTS 206. A HOA in BTS 206 communicates the handover request to GW-HOC 502, through HOC relay 504. Thereafter, GW-HOC 502 communicates with GW-RRC 402 and determines that BTS 208 has spare capacity to accommodate the MS. Therefore, GW-HOC 502 communicates the handover request to a BTS-HOC in BTS 208. Thereafter, the MS is handed over from BTS 206 to BTS 208.

Similarly, when heterogeneous ASN-GW 202 interfaces with a second-profile BTS, heterogeneous ASN-GW 202 acts as a second-profile ASN-GW. Therefore, one or more of GW-HOC 502 and handover relay 504 communicates with a BTS-HOC in the second-profile BTS to provide handover management to the second-profile BTS. For example, one or more of GW-HOC 502 and HOC relay 504 communicate with a BTS-HOC in BTS 208 to provide handover management to BTS 208.

In order to handover a MS from a serving second-profile BTS to a target second-profile BTS, a HOC in the serving second-profile BTS initiates a handover request and communicates the handover request to HOC relay 504. HOC relay 504 relays the handover request to a HOC in the target second-profile BTS. Thereafter, the MS is handed over from the serving second-profile BTS to the target second-profile BTS.

Further, in order to handover a MS from a second-profile BTS to a first-profile BTS, a BTS-HOC in the second-profile BTS communicates a handover request to HOC relay 504. Subsequently, HOC relay 504 forwards the handover request to GW-HOC 502. The handover request may specify a first-profile BTS to which the connectivity of the MS can be transferred. GW-HOC 502 may add data-path and key information to the handover request and communicate the handover request to a HOA in the first-profile BTS specified in the handover request. For example, in order to handover a MS from BTS 208 to BTS 206, a BTS-HOC in BTS 208 communicates a handover request to GW-HOC 502. The handover request specifies BTS 206 as a BTS that can accommodate the MS. GW-HOC 502 adds data-path and key information to the handover request and communicates the handover request to a HOA in BTS 206. Thereafter, the MS is handed over from BTS 208 to BTS 206.

Therefore, GW-HOC 502 and HOC relay 504 enable heterogeneous ASN-GW 202 to provide handover management to each of a first-profile BTS and a second-profile BTS in ASN 102.

Figure 6:
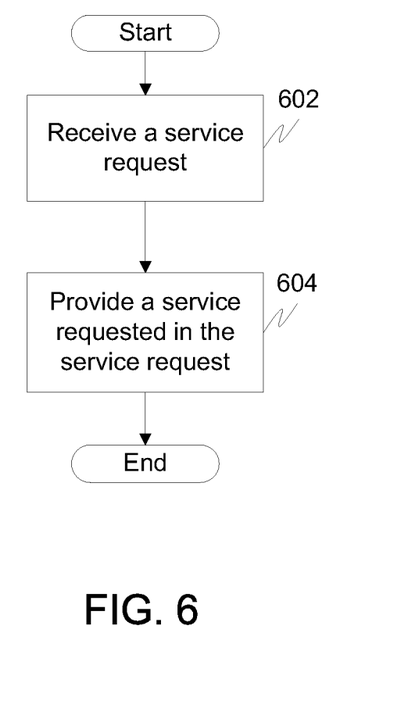
FIG. 6 is a flowchart of a method for communication in an ASN in a WiMAX communication network, in accordance with an embodiment of the invention.

FIG. 6 is a flowchart of a method for communication in ASN 102 in WiMAX communication network 100, in accordance with an embodiment of the invention. At step 602, heterogeneous ASN-GW 202 receives a service request from one or more BTSs. A BTS operates in one of the first-profile and the second-profile in ASN 102. The service request may be for example, a RRM request or a handover management request. This is explained in detail in conjunction with FIG. 8, FIG. 9, FIG. 10, FIG. 11 and FIG. 12. Thereafter, at step 604, heterogeneous ASN-GW 202 provides a service requested in the service request to one or more BTSs that sent the service request. In an RRM request, a BTS communicates with heterogeneous ASN-GW 202 requesting for spare capacity report of another BTS. For example, a second-profile BTS may communicate a RRM request to heterogeneous ASN-GW 202 for spare capacity report of a first-profile BTS. In response to the RRM request, heterogeneous ASN-GW 202 communicates the spare capacity report of first-profile BTS to the second-profile BTS. This is further explained in conjunction with FIG. 8. In a handover management request, heterogeneous ASN-GW 202 receives a request to handover a MS from the serving BTS to a target BTS. Heterogeneous ASN-GW 202 facilitates in handover of the MS from the serving BTS to the target BTS. This is further explained in conjunction with FIG. 9, FIG. 10, FIG. 11 and FIG. 12.

Figure 7:
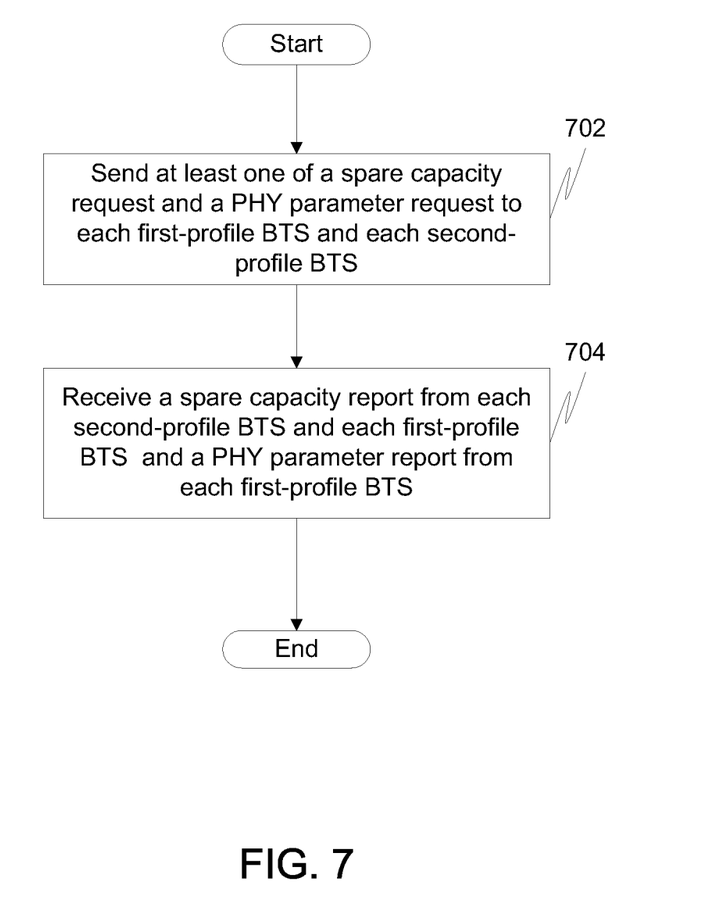
FIG. 7 is a flowchart of a method of receiving radio resource related information in ASN 102 in WiMAX communication network 100, in accordance with an embodiment of the invention.

FIG. 7 is a flowchart of a method of receiving radio resource related information in ASN 102 in WiMAX communication network 100, in accordance with an embodiment of the invention. At step 702, GW-RRC 402 sends one or more of a spare capacity request and a PHY parameter request to each first-profile BTS that interface with heterogeneous ASN-GW 202 and each second-profile BTS that interface with heterogeneous ASN-GW 202 in WiMAX communication network 100. For example, GW-RRC 402 sends one or more of a spare capacity request and a PHY parameter request to BTS 206 and BTS 208 that interface with heterogeneous ASN-GW 202.

At step 704, GW-RRC 402 receives a spare capacity report, through RRM relay 404, from each first-profile BTS and each second-profile BTS and a PHY parameter report from each first-profile BTS in response to the PHY parameter request. For example, in response to spare capacity request issued by GW-RRC 402, each of BTS 206 and BTS 208 send a spare capacity report to GW-RRC 402, through RRM relay 404. Similarly, in response to the PHY parameter request, BTS 206, which is a first-profile BTS, sends a PHY parameter report to GW-RRC 402, through RRM relay 404. BTS 208, which is a second-profile BTS, does not send a PHY parameter report in response to the corresponding PHY parameter request as the PHY parameter report is used by a RRC in BTS 208 itself. Therefore, BTS 208 discards the PHY parameter request.

GW-RRC 402 may embed instruction in the spare capacity request and the PHY parameter request to receive a corresponding report periodically. Based on this, each first-profile BTS and each second-profile BTS may send a spare capacity report periodically after a first predetermined time period. Similarly, each first-profile BTS may send a PHY parameter report periodically after a second predetermined time period. Each of the first predetermined time period and the second predetermined time period may be specified by GW-RRC 402 in the corresponding request.

Figure 8:
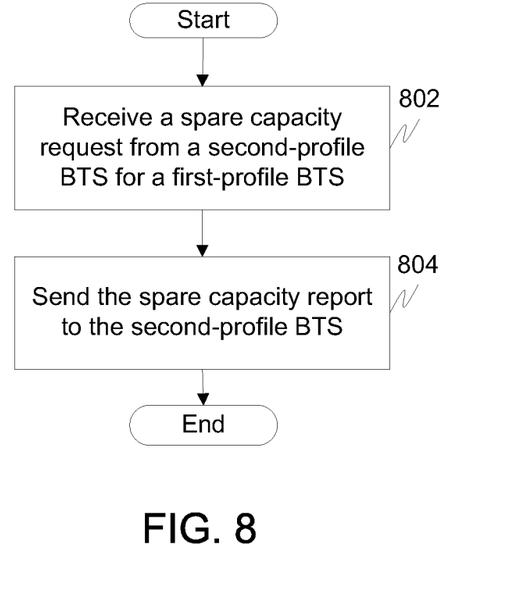
FIG. 8 is a flowchart of a method of providing a service for RRM in a WiMAX communication network, in accordance with an embodiment of the invention.

FIG. 8 is a flowchart of a method of proving a service for RRM in WiMAX communication network 100, in accordance with an embodiment of the invention. In this embodiment, a second-profile BTS requests GW-RRC 402 for a spare capacity report of a first-profile BTS. At step 802, GW-RRC 402 receives a spare capacity request, through RRM relay 404, from a second-profile BTS for a first-profile BTS. Thereafter, at step 804, GW-RRC 402 sends the spare capacity report of the first-profile BTS, which GW-RRC 402 already has, to the second-profile BTS. For example, BTS 208 communicates a request to GW-RRC 402, through RRM relay 404, for spare capacity report of BTS 206. In response to the request, GW-RRC 402 sends the spare capacity report of BTS 206 to BTS 208.

Figure 9:
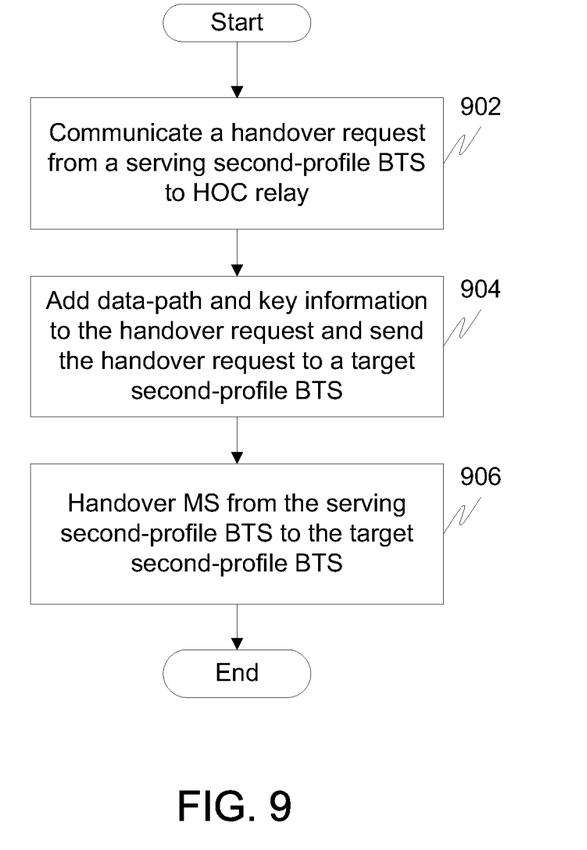
FIG. 9 is a flowchart of a method of serving a request, initiated by a BTS, for handover management in a WiMAX communication network, in accordance with an embodiment of the invention.

FIG. 9 is a flowchart of a method of serving a request, initiated by a BTS, for handover management in WiMAX communication network 100, in accordance with an embodiment of the invention. In this embodiment, a MS is handed over from a serving second-profile BTS to a target second-profile BTS. At step 902, the serving second-profile BTS communicates a handover request to HOC relay 504. The handover request may specify a target second-profile BTS which can accommodate the MS. At step 904, heterogeneous ASN-GW 202 adds data-path and key information to the handover request and sends the handover request to the target second-profile BTS specified in the handover request. Thereafter, at step 906, the MS is handed over from the serving second-profile BTS to the target second-profile BTS. The MS may be handed over in order to balance load on the serving second-profile BTS.

Figure 10:
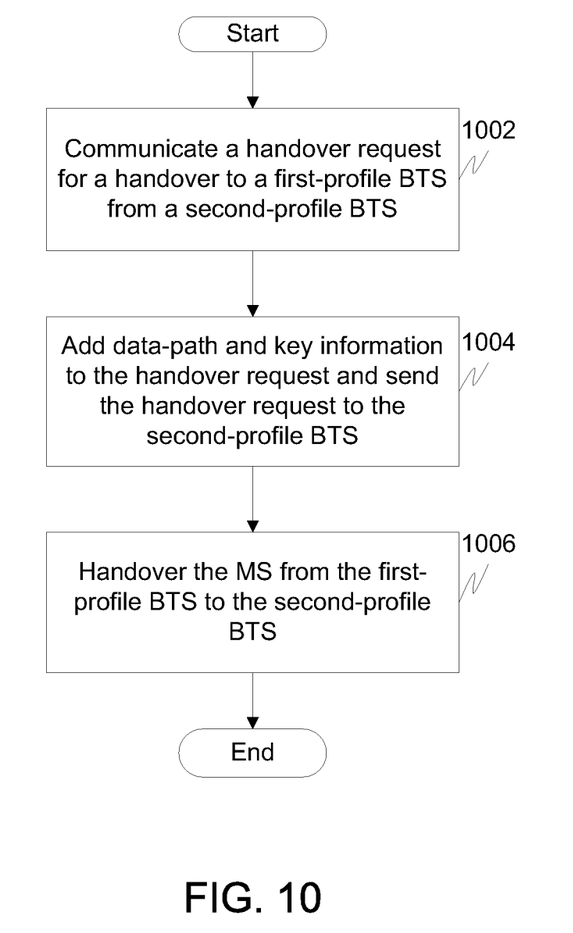
FIG. 10 is a flowchart of a method of serving a request, initiated by a BTS, for handover management in a WiMAX communication network, in accordance with another embodiment of the invention.

FIG. 10 is a flowchart of a method of serving a request, initiated by a BTS, for handover management in WiMAX communication network 100, in accordance with an embodiment of the invention. In this embodiment, a MS is handed over from a second-profile BTS to a first-profile BTS. At step 1002, a second-profile BTS communicates a handover request to GW-HOC 502, through HOC relay 504. The handover request may specify a first-profile BTS which can accommodate the MS. At step 1004, GW-HOC 502 adds data-path and key information to the handover request and sends it to the first-profile BTS specified in the handover request. Thereafter, at step 1006, the MS is handed over from the second-profile BTS to the first-profile BTS. The MS may be handed over in order to balance load on the second-profile BTS.

Figure 11:
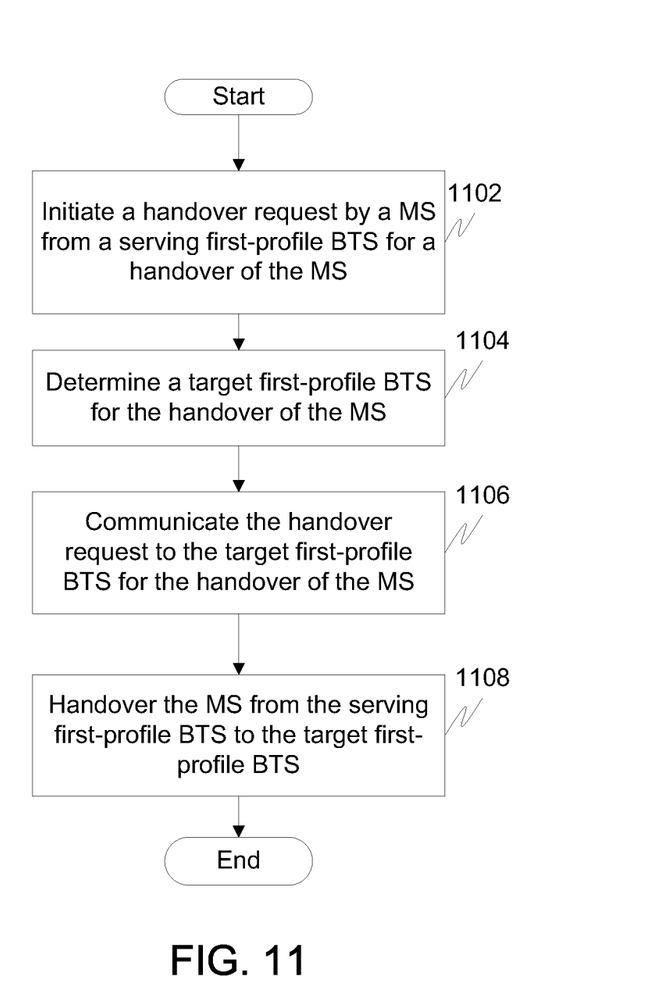
FIG. 11 is a flowchart of a method of serving a request, initiated by a MS, for handover management in a WiMAX communication network, in accordance with an embodiment of the invention.

FIG. 11 is a flowchart of a method of serving a request, initiated by a MS, for handover management in a WiMAX communication network 100, in accordance with an embodiment of the invention. In this embodiment, handover of a MS, from a serving first-profile BTS to a target first-profile BTS, is initiated by the MS itself. At step 1102, the MS initiates a handover request from the serving first-profile BTS for a handover of the MS.

At step 1104, GW-HOC 502 determines a target first-profile BTS that has a spare capacity for accommodating the MS from the serving first-profile BTS. In order to determine a target first-profile BTS that has spare capacity to accommodate the MS, GW-HOC 502 communicates with GW-RRC 402. At step 1106, the handover request is communicated to the target first-profile BTS for the handover of the MS. Thereafter, at step 1108, the MS is handed over from the serving first-profile BTS to the target first-profile BTS.

Figure 12:
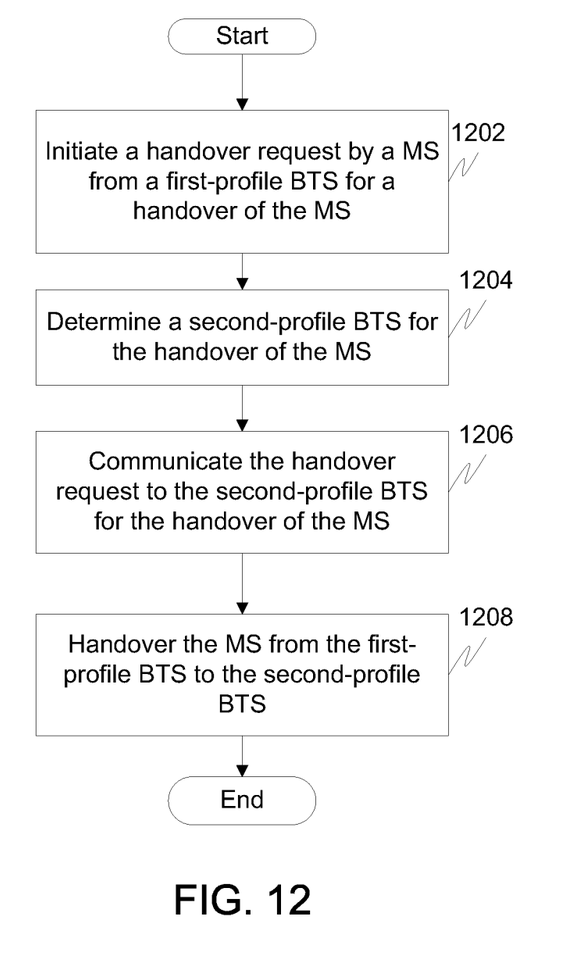
FIG. 12 is a flowchart of a method of serving a request, initiated by a MS, for handover management in a WiMAX communication network, in accordance with another embodiment of the invention.

FIG. 12 is a flowchart of a method of serving a request, initiated by a MS, for handover management in a WiMAX communication network, in accordance with another embodiment of the invention. In this embodiment, handover of a MS, from a first-profile BTS to a second-profile BTS, is initiated by the MS itself. At step 1202, the MS initiates a handover request from the first-profile BTS. For example, the MS may initially be in communication with BTS 206. The MS initiates a handover request and communicates the handover request to BTS 206. The MS may initiate a handover request, for example, when the MS detects deterioration in quality of the channel used for communicating with the first-profile BTS. Such deterioration may occur, for example, if the MS is moving out of the coverage area of the first-profile BTS.

At step 1204, GW-HOC 502 determines a BTS that has a spare capacity to accommodate the MS from the BTS. In order to determine a BTS that has spare capacity to accommodate the MS, GW-HOC 502 communicates with GW-RRC 402. At step 1206, the handover request is communicated to the BTS for the handover of the MS. Thereafter, at step 1208, the MS is handed over from the first-profile BTS to the second-profile BTS. For example, upon receiving a handover request from BTS 206, GW-HOC 502 communicates with GW-RRC 402 and determines that BTS 208 has spare capacity to accommodate the MS. Thereafter, GW-HOC 502 communicates the handover request to BTS 208 and the MS is handed over from BTS 206 to BTS 208.

The foregoing description explains how a heterogeneous ASN-GW provides RRM and Handover Management to one or more first-profile BTSs and/or one or more second-profile BTSs interfacing with the heterogeneous ASN-GW. A heterogeneous ASN-GW is capable of interfacing with network elements operating in one of the first-profile and the second-profile ASN.

Various embodiments of the present invention provide a heterogeneous ASN-GW. The heterogeneous ASN-GW operates in each of the first-profile and the second-profile. Therefore, the heterogeneous ASN-GW is able to interface with each of a first-profile ASN-GW and a second-profile ASN-GW. Similarly, heterogeneous ASN-GW is able to interface with first-profile BTSs and second-profile BTSs. This enables a more flexible implementation of ASN and has the advantages of both the first-profile (centralized load balancing approach) and the second-profile (distributed load balancing approach).

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A heterogeneous Access Service Network-Gateway (ASN-GW) in an ASN in a Worldwide Interoperability for Microwave Access (WiMAX) communication network, the heterogeneous ASN-GW comprising:
 a radio resource module configured to provide Radio Resource Management (RRM) to a set of Base Transceiver Stations (BTSs) in the ASN, a first subset of the set of BTSs configured to operate according to a first-profile and a second subset of the set of BTSs configured to operate according to a second-profile; and
 a handover module operatively coupled with the radio resource module and configured to provide handover management to at least one BTS in the set of BTSs.

2. The heterogeneous ASN-GW of claim 1, wherein the radio resource module comprises:
 a GW-Radio Resource Controller (RRC) configured to communicate with at least one second-profile BTS including a BTS-RRC and a Radio Resource Agent (RRA) in the ASN and at least one first-profile BTS including a RRA in the ASN, the at least one second-profile BTS configured to operate according to the second-profile and the at least one first-profile BTS configured to operate according to the first-profile; and
 a Radio Resource Management (RRM) relay configured to communicate with at least one second-profile BTS including a BTS-RRC.

3. The heterogeneous ASN-GW of claim 2, wherein the GW-RRC sends at least one spare capacity request and at least one physical (PHY) parameter request to the at least one second-profile BTS that interfaces with the heterogeneous ASN-GW and to the at least one first-profile BTS that interfaces with the heterogeneous ASN-GW.

4. The heterogeneous ASN-GW of claim 3, wherein the at least one second-profile BTS is further configured to discard the PHY parameter request.

5. The heterogeneous ASN-GW of claim 3, wherein the GW-RRC a PHY parameter report from the at least one first-profile BTS, the at least one first-profile BTS further configured to interface with the heterogeneous ASN-GW in response to a corresponding PHY parameter request sent by the GW-RRC.

6. The heterogeneous ASN-GW of claim 3, wherein both of the at least one second-profile BTS further configured to interface with the heterogeneous ASN-GW and the at least one first-profile BTS configured to interface with the heterogeneous ASN-GW are further still configured to send a spare capacity report to the GW-RRC in response to a corresponding spare capacity request received from the GW-RRC.

7. The heterogeneous ASN-GW of claim 3, wherein the at least one BTS-RRC of a second-profile BTS is configured to communicate with the GW-RRC, and further configured to receive a spare capacity report for the at least one first-profile BTS, the GW-RRC is further configured to maintain the spare capacity report for the at least one first-profile BTS.

8. The heterogeneous ASN-GW of claim 2, wherein the handover module includes:
 a GW-Handover Controller (HOC) configured to communicate with the at least one second-profile BTS, which includes a BTS-HOC and a Handover Agent (HOA) and the at least one first-profile BTS comprising a HOA; and
 a HOC relay configured to communicate with the at least one second-profile BTS, which includes a BTS-HOC.

9. The heterogeneous ASN-GW of claim 8, wherein the BTS-HOC of the at least one second-profile BTS is configured to communicate a handover request to the GW-HOC for a handover of a Mobile Station (MS) to the at least one first-profile BTS, the handover request specifies the at least one first-profile BTS for handover of the MS, the GW-HOC further configured to communicate the handover request to a HOA of the at least one first-profile BTS specified in the handover request for the handover of the MS.

10. The heterogeneous ASN-GW of claim 9, wherein the GW-HOC is further configured to add datapath information and key information to the handover request of the MS and configured to send the handover request of the MS to the HOA of the at least one first-profile BTS.

11. The heterogeneous ASN-GW of claim 8, wherein the HOA of the at least one first-profile BTS is configured to communicate a handover request initiated by a MS to the GW-HOC for the handover of the MS.

12. The heterogeneous ASN-GW of claim 11, wherein:
the GW-HOC is further configured to communicate the handover request of the MS to the BTS-HOC of the at least one second-profile BTS; and
the GW-HOC is still further configured to communicate with the GW-RRC to determine the at least one second-profile BTS for the handover of the MS.

13. The heterogeneous ASN-GW of claim 1, wherein one or more BTSs of the first subset of the set of BTSs configured to operate according to the first-profile and one or more BTSs of the second subset of the set of BTSs configured to operate according to the second-profile are configured to communicate with the heterogeneous ASN-GW for RRM.

14. A method of communication in an Access Service Network (ASN) in a Worldwide Interoperability for Microwave Access (WiMAX) communication network, the method comprising:
receiving a service request from at least one Base Transceiver Station (BTS) of a set of Base Transceiver Stations (BTSs), a first subset of the set of BTSs configured to operate according to a first-profile and a second subset of the set of BTSs configured to operate according to a second-profile; and
providing a service requested in the service request to the at least one BTS.

15. The method of claim 14, wherein providing the service requested comprises:
sending at least one of a spare capacity request and at least one physical (PHY) parameter request to at least one second-profile BTS that interfaces with a heterogeneous ASN-GW and to at least one first-profile BTS that interfaces with the heterogeneous ASN-GW; and
receiving each of:
a spare capacity report from the at least one second-profile BTS that interfaces with the heterogeneous ASN-GW and a spare capacity report from the at least one first-profile BTS that interfaces with the heterogeneous ASN-GW in response to the corresponding spare capacity request; and
a PHY parameter report from the at least one first-profile BTS that interfaces with the heterogeneous ASN-GW and a PHY parameter report from the at least one second-profile BTS that interfaces with the heterogeneous ASN-GW in response to the corresponding PHY parameter request.

16. The method of claim 15, further including receiving the spare capacity report periodically after a first predetermined time period from the at least one second-profile BTS and the at least one first-profile BTS; and
receiving the PHY parameter report periodically after a second predetermined time period from the at least one second-profile BTS and the at least one first-profile BTS.

17. The method of claim 15, wherein the at least one second-profile BTS is further configured to discard the PHY parameter report.

18. The method of claim 14, wherein the service request is a request for Radio Resource Management (RRM).

19. The method of claim 18, wherein providing the service requested further includes:
receiving a spare capacity request from the at least one second-profile BTS for the at least one first-profile BTS; and
sending the spare capacity report to the at least one second-profile BTS in response to the spare capacity request.

20. The method of claim 14, wherein the service request is a request for handover management.

21. The method of claim 20, wherein providing the service requested further includes communicating a handover request for a handover of a Mobile Station (MS) to the at least one first-profile BTS from the at least one second-profile BTS, the handover request specifies the at least one first-profile BTS for handover of the MS.

22. The method of claim 21 further comprising adding datapath and key information to the handover request before sending to the at least one first-profile BTS specified in the handover request.

23. The method of claim 20, wherein providing the service requested further includes:
initiating a handover request by the MS from the at least one first-profile BTS for a handover;
determining the at least one second-profile BTS for the handover; and
communicating the handover request to the at least one second-profile BTS for the handover of the MS.

24. A system for communication in an Access Service Network (ASN) in a Worldwide Interoperability for Microwave Access (WiMAX) communication network, the system comprising:
a plurality of Base Transceiver Stations (BTSs), a first subset of the plurality of BTSs configured to operate according to a first-profile and a second subset of the plurality of BTSs configured to operate according to a second-profile in the ASN; and
at least one heterogeneous ASN-Gateway (ASN-GW) configured to communicate with a set of BTSs of the plurality of BTSs, the heterogeneous ASN-GW configured to operate according to the first-profile or the second-profile.

25. The system of claim 24 further including the at least one ASN-GW, further configured to operate according to the second-profile or the first-profile; and
further configured to be associated with the set of BTSs of the plurality of BTSs.

26. The system of claim 25, wherein the heterogeneous ASN-GW is configured to communicate with a set of ASN-GWs.

* * * * *